FREDERICK W. JOBE
RAYMOND F. E. STEGEMAN
INVENTORS

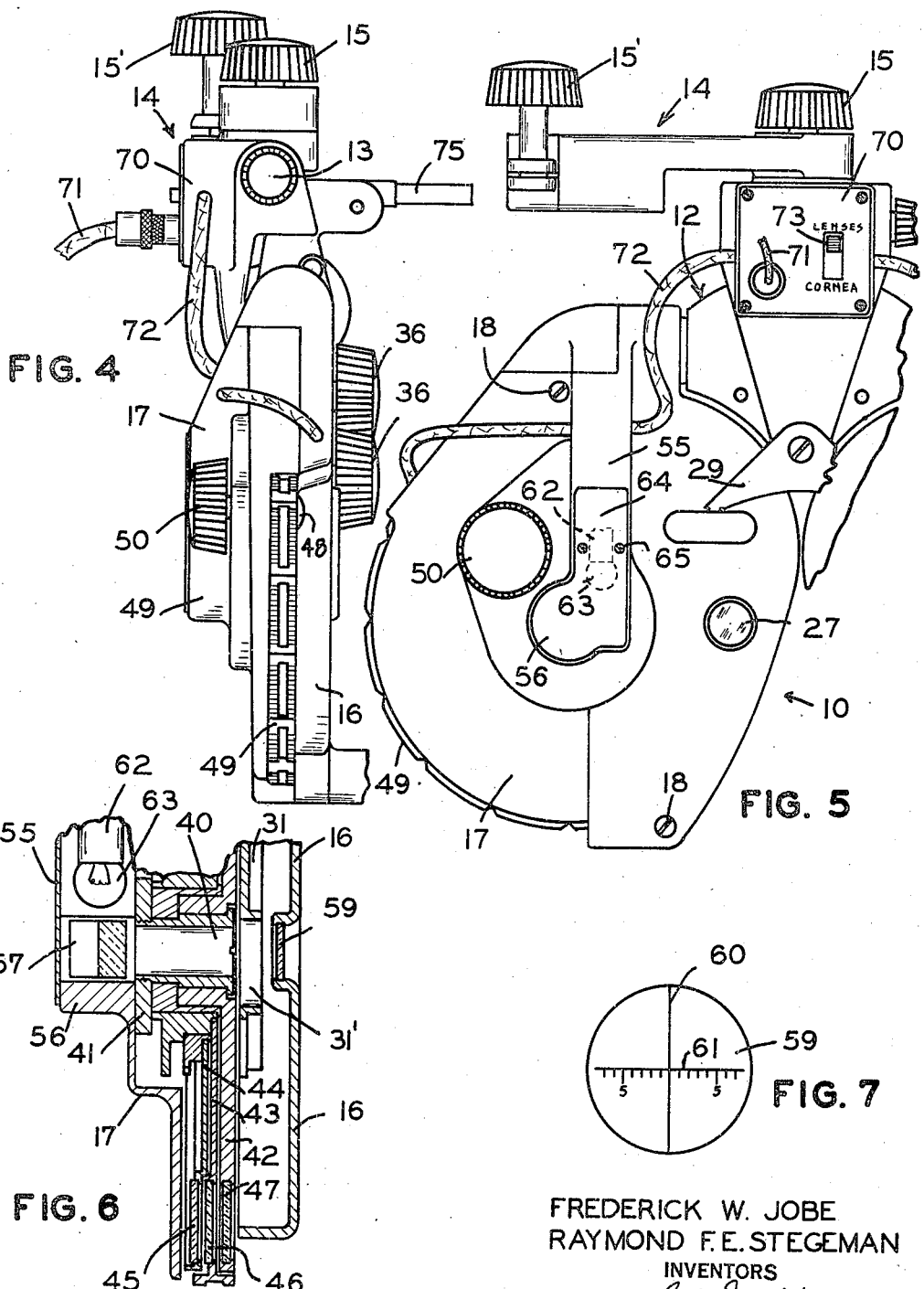

Patented Sept. 21, 1943

2,329,907

UNITED STATES PATENT OFFICE 2,329,907

REFRACTOR

Frederick W. Jobe, Brighton, and Raymond F. E. Stegeman, Rochester, N. Y., assignors to Bausch & Lomb Optical Company, Rochester, N. Y., a corporation of New York Application January 28, 1942, Serial No. 428,582

10 Claims. (Cl. 88—22)

The invention relates to eye testing devices and more particularly has reference to ophthalmic instruments of the class known as refractors.

An important object of the invention is to provide a refractor of novel construction which is designed to permit eye testing to be conducted with facility and accuracy. Another object is to provide an eye testing device having improved cornea sighting means which may also be used to measure the distance of the test lenses from each cornea of a patient. Still another object resides in the provision, in each lens carrying housing of a refractor, of a hollow shaft on which lens carrying disks are mounted and with which optical means are aligned for observing a patient's eye. A further object is to devise a refractor construction which obviates the use of direct light on a patient's face during testing procedure. Still a further object of the invention is to provide lighting means within each housing of a refractor whereby to illuminate the lens power numerals on the lens carrying disks of the device. Still a further object resides in the provision of simple mechanism to adjust the instrument to the pupillary distance of a patient.

With these and other objects in view which may be incident to the improvements herein described, the invention consists in the parts and combinations to be later set forth, with the understanding that the necessary elements of which the invention is comprised may be varied in construction, proportion and arrangement without departure from the spirit thereof or without exceeding the scope of the appended claims.

To make the invention clearly understood, the accompanying drawings show means for carrying the same into practical effect without limiting the improvements in their useful applications to the specific constructions which, for the purpose of illustration, have been made the subject of illustration.

In the drawings, wherein like reference characters indicate like parts throughout the different views:

Figure 4 is a side elevation of the instrument.

Figure 5 is a partial back elevation of the refractor.

Figure 6 is a partial side elevation taken in section on the line 6—6 of Figure 1.

Figure 7 shows the cornea scale as it appears in the field of view of the refractionist.

Figure 1:
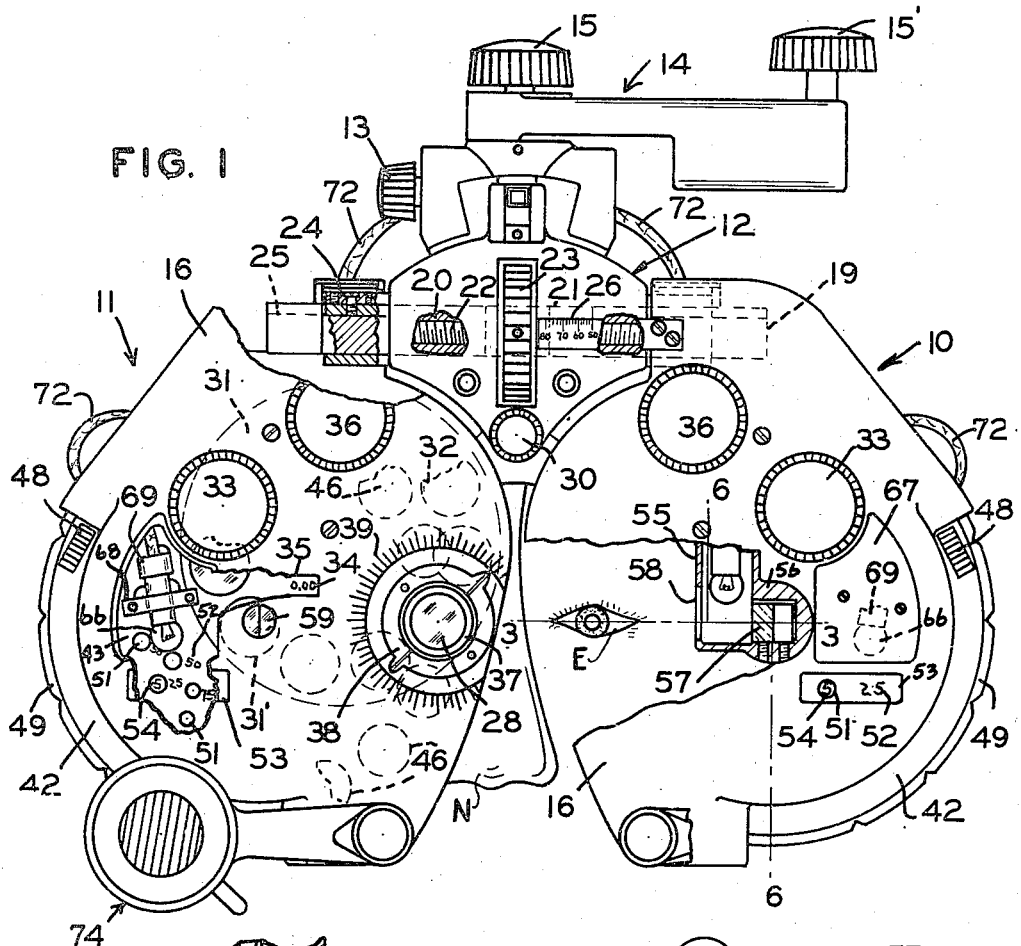
Figure 1 is a front elevation of the refractor with parts broken away to show various details of the interior of each lens carrying housing and also the pupillary distance adjustment.

As shown in Figure 1, the refractor forming the subject of this invention comprises two lens carrying housings 10 and 11 which are adjustably attached to the usual pivot member 12 and which are movable towards and away from each other. Pivot member 12 is pivoted, in well known manner, to a conventional support 14 so as to allow customary tilting adjustment of the instrument about a horizontal axis on the actuation of the operating button 13. Support 14 is constructed to carry the instrument for rotatable adjustment about a vertical axis, clamp 15 being provided for holding it in adjusted position, and the support is also adapted to engage the arm of a suitable ophthalmic stand and to be secured in mounted position thereon by the screw 15'.

Each housing 10 and 11 is made up of a front face member 16 which is secured to a back face member 17 by screws 18, reference being made to Figures 1, 4 and 5. As used herein the term "front" designates the face of the refractor which is adjacent the operator or most distant from the patient while "back" is used to designate the face of the instrument which is nearest the patient.

The construction for adjustably securing the lens housings 10 and 11 to pivot member 12 makes use of a recess 19 which is formed in the upper portion of each front face member 16 for receiving an elongated nut 20. Each nut 20 is suitably secured within its respective recess 19 and has its outer portion slidably mounted within a bore 21 which extends through the pivot member 12. A screw 22 also extends through the bore 21 and has each of its ends engaged with a nut 20. The center portion of the screw 22 is unthreaded and has an operating wheel 23 secured thereto, the pivot member 12 being suitably cut away to permit wheel 23 to be mounted on the screw.

It will be apparent that by rotation of wheel 23, the housings 10 and 11 may be moved towards and away from each other so as to adjust the instrument to a desired pupillary distance. Keys 24, one for each nut 20, are each carried by the pivot member 12 in the manner shown in Figure 1 and are each adapted to extend within a groove 25 formed in a nut so as to prevent rotation of the lens housings on actuation of the screw 22. A scale 26, secured to the front face member 16 of one of the lens carrying housings, is adapted to cooperate with a suitable index line on the member 12 to permit measurement of the pupillary distance.

The back face member 17 of each lens carrying housing is provided with a sight opening 27 through which the patient looks. Each opening 27, which is shown in Figure 5, is aligned with a similar sight opening 28 in the front face member 16 of each housing. Sight opening 28 is best shown in Figure 1 wherein the left eye E and the nose N of a patient being tested are illustrated in conjunction with the refractor. During testing, the forehead of the patient bears against a forehead rest 29 which is adjustable in a plane normal to the plane of Figure 1 by conventional mechanism operated on the actuation of the knob 30.

Figure 2:
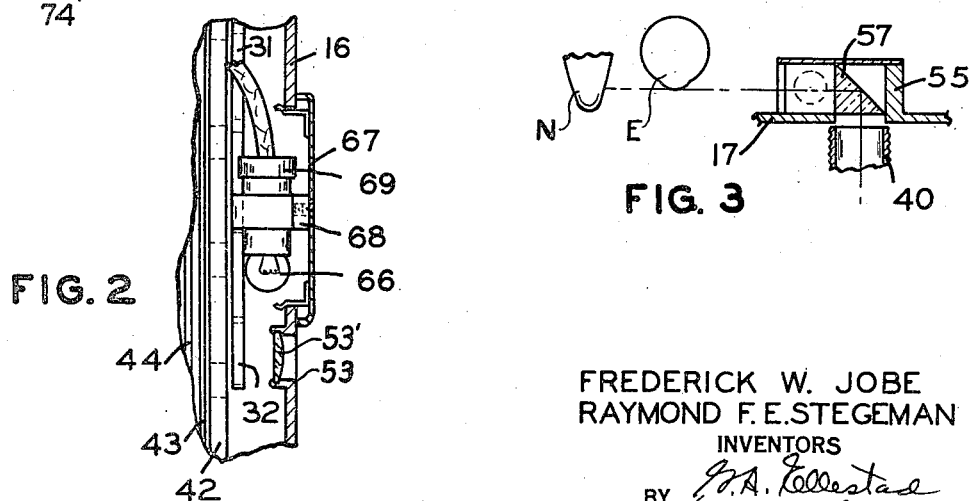
Figure 2 is a partial side elevation taken in series through a lens carrying housing to detail the illuminating means for the lens carrying disks.

The usual lens disks employed with instruments of this character to carry cylindrical and spherical lenses are rotatably mounted in each housing 10 and 11 so that the lenses may be selectively brought into registry with the sight openings 27 and 28. When in operating position, each lens has its optical axis substantially perpendicular to the plane of the sight openings. Referring to Figures 1, 2 and 6, the cylindrical lens system in each housing 10 and 11 comprises a disk 31 having a suitable member of spaced concentric openings in all of which, except the opening 31' which is used as an open aperture, there is rotatably mounted a cylindrical lens 32. These lenses are arranged in the openings to successively differ in strength by constant steps of lens power, for example by steps of 0.25 diopter, the open aperture being used for zero lens power.

Lens power indicia such as the numerals 34 are placed at suitable locations on the front face of each disk 31 for indicating the power of each lens 32 and also for indicating the open aperture of zero power. The numerals 34 on each disk 31 are adapted to register with a window 35 in the front face member 16 before the disk and to indicate by the numerals appearing in the window the power of the lens 32 or open aperture 31' in registry with the sight openings 27 and 28. The open aperture 31' is in registry with the sight openings in Figure 1 as indicated by the appearance of the numerals "0.00" in the window 35.

Conventional mechanism, not shown but similar to that set forth in U. S. Patents 1,804,691 and 1,945,940 to C. L. Hunsicker, is mounted within each housing 10 and 11 to rotate the disks 31 and also the cylindrical lenses 32 so as to allow desired orientation of the axis of each of the latter. Each disk 31 is rotated in either direction upon suitable actuation of the operating knob 33 at the front of its lens carrying housing while the lenses 32 of the disk are rotated in their seats by the operating knob 36. The usual sight tube 37, provided with a pointer 38, is rotatably mounted within each sight opening 28 and is rotated by well known means driven by the mechanism for rotating the lenses 32 in their seats. Location of the cylinder axis of a lens 32 in operating or working position with the sight openings is indicated by the position of the adjacent pointer 38 on the dial 39 formed on the front face of the housing for the lens.

The construction for mounting the spherical lens system in each housing makes use of a hollow shaft 40 threaded into a support plate 41 which is suitably secured to the back face member 17 of its respective lens carrying housing. Three disks 42, 43 and 44 are rotatably mounted on each shaft. Each disk has spaced concentric openings that are adapted to be selectively brought into registry with the sight openings in their respective lens housings on rotation of the disks.

Disks 44 and 43 are each provided with a suitable number of openings, one opening in each disk being left free to provide an open aperture and the remaining openings having spherical lenses seated therein. Disk 44, commonly called the basic sphere disk, carries strong positive and negative spheres which successively differ in lens power by constant steps of relatively large degree, for example by 4.00 diopters. On the other hand, disk 43, generally known as the spherical disk, carries weak spheres which differ in strength by small intervals, for example by 0.25 diopter.

The disk 42 in each housing 10 and 11 provides the customary shutter disk having the usual shutter portion for selectively closing off the sight openings in its housing. Shutter disk 42 may also be provided with several auxiliary lenses one of which is shown at 47 in Figure 6, and although not shown, may also have an open aperture, a pin-hole and a filter. These elements and openings in each shutter disk 42 are positioned so that they may be selectively brought into registry with the sight openings 27 and 28 of the housing which carries the disk on rotation of the latter. Shutter disks 42 extend beyond their respective housings and are each provided with a fingerpiece 48 for effecting their rotation.

It may be noted that the axes of the shafts which carry the various disks in the housings 10 and 11 are substantially parallel to the axis of the sight openings in their lens carrying housing. Also it should be observed that the lenses of the various disks besides being in concentric relation to their respective shaft are each positioned in its respective disk so that its optical axis is substantially parallel to the axis of the shafts when the lens is in operating or non-operating position.

Rotation of each spherical disk 43 is effected by hand, these disks extending beyond their respective housings 10 and 11 in the manner shown in Figures 1 and 6 and being each provided with a knurled flange 49 which affords a grip for manual operation. As is customary in instruments of this character, each disk 43 and each basic lens disk 44 within the same housing are interconnected by suitable mechanism, similar to that set forth in Patents 1,804,691 and 1,945,940 heretofore mentioned, so that each disk 44 will be rotated by an amount equal to the arcuate spacing between adjacent basic lenses 45 on each revolution of the weak sphere disk 43 from its zero position.

Conventional mechanism, also similar to that shown in the patents just above noted, is provided in each housing for rotating the basic lens disk 44 independently of the disk 43. This mechanism is actuated through a knob 50 secured to a drive shaft which extends through the back face member 17 of the lens carrying housing for the mechanism. The independent rotation of the basic lens disks 44 permits quick clearing of the instrument.

The total power of any working combination of spherical lenses used with each housing is indicated by any well known means, for example, by means similar to those shown in Patent 1,945,940 heretofore mentioned. These means comprise openings 51 in each spherical disk 43, lens power indicia in the form of numerals 52 marked adjacent certain of the openings 51 on the front face of each disk 43 and other lens power indicia in the form of numerals 54 marked on the front face of each basic sphere disk 44. Openings 51 are located in each disk 43 in well known manner so that one of them will register with an observation window 53 formed in the front face of the lens carrying housing for the disk when a lens 46 or the open aperture of the disk is in an operating position. Reading of the indicia is facilitated by the magnifyng lens 53' mounted in window 53. The lens power indicia 52 opposite an opening 51 is also positioned so that it will register with the window 53 simultaneously with that opening. Where an opening 51 is in register with a window 53, some numeral or numerals 54 because of the location of the same on the disk 44 in back of the opening 51 will register with the latter so as to appear through the window 53 with which that opening 51 is in register. Observation through each window 53 is made possible by providing a suitable cutaway portion, not illustrated in the drawings, in each shutter disk 42 in a location wherein it will be positioned in back of each window 53 when testing is being conducted with the spherical and cylindrical lens systems.

The lens power indicia 54 which appears through a window 53 is adapted to be combined with the indicia 52 showing through that window to indicate the total positive or negatve lens power in diopters and fractons thereof for any working lens combination within the lens carrying housing of that window as well as zero power when the free aperture of each disk 43 and 44 of that housing are in operating position.

As already pointed out, an important feature of the invention resides in optical means which permit a refractionist to observe the position of the cornea of each eye of a patient with respect to the position of the instrument. This allows adjustment of the refractor so that the basic spheres 45 in each lens carrying housing will be located at a preferred distance from the corneas of the eyes when the spheres are in working position and further permits measurement of the separation between each cornea and the working position for its basic spheres. It has been found that this separation, which may be termed the refracting distance, is preferably 16 mm. The importance of accurate determination of the refracting distance will be appreciated when it is considered that spectacle lenses prescribed from the results of refraction should, to give optimum benefit, be held before the eyes in accordance with the refracting distance used in eye testing.

While it is a relatively simple matter to find the refracting distance when using a trial frame, some difficulty is encountered in determining this distance when using a refractor by reason of the construction of the latter and also by the fact that the patient's face is largely covered by such an instrument. In accordance with the invention, the optical means for accomplishing this make use of a projecting portion 55 in the form of a generally rectilinear shaped housing which is located on the side of each back face member 17 nearest the patient so that its longitudinal axis is vertically positioned. As best shown in Figures 1 and 5, the lower end of each auxiliary housing 55 is flared outwardly into an extension section 56 within which suitable reflecting means, such as the right angle prism 57, are mounted.

Figure 3:
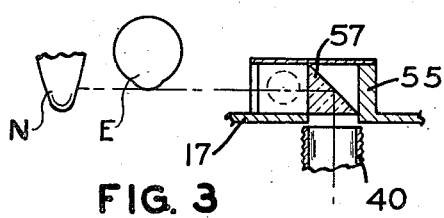
Figure 3 is a partial plan view taken in section on the line 3—3 of Figure 1.

Each extension section 56 lies in back of a hollow shaft 40 and has the center of its interior aligned with the longitudinal axis of such shaft. Conventional means making use of pressure screws are employed in mounting each prism 57 so that it is held, as shown in Figures 1 and 3, in center relation to the longitudinal axis of its respective shaft 40. Each prism 57 is also aligned with an opening 58 in the side of its respective extension section 56 which is adjacent the eye of a patient so that the prism may image the eye. By this construction it is only necesssary to look through each shaft 40 and into its prism, each prism being located opposite a position to be occupied by an eye, in order to observe the patient's eyes, this being permitted by forming an observation window 59 in alignment with each shaft 40 in the front face member 16 of each housing 10 and 11. As each cylinder disk 31 is carried in front of a hollow shaft 40, it is necessary to have the latter located with respect to the disk so that the free aperture in the disk may be brought into registry with the hollow shaft when the eye observation means are in operation.

Also forming a part of the optical means for comparing the relative position of each eye to the basic spherical lenses 45, is a suitable scale which may be formed on the face of each prism 57 that is nearest the eye of the patient. Each scale is used in conjunction with a vertically positioned fiducial line 60 which is formed on a face of each window 59 and which is located to intersect the longitudinal axis of the hollow shaft 40 adjacent the window. When seen by the refractionist on looking into a window 59, the scale and fiducial line appear as shown in Figure 7 wherein the image 61 of the scale is seen in back of the fiducial line 60.

As each prism 57 is located at a known distance from the plane of a basic sphere in operating position, the zero scale mark may be readily located to indicate the preferred distance for carrying out the refraction and the scale marks on each size of the zero to indicate the amount, for example in millimeters, by which the refracting distance which may be used exceeds or is less than the preferred refracting distance. In practice, the cornea is sighted through a hollow shaft 40 to determine the relation of the cornea to the scale and the fiducial line 60 and, if necessary, the instrument is adjusted to bring the fiducial line 60 and the zero scale mark into common tangency with the cornea of the eye being observed. When such is accomplished, at least the test lenses in one of the housings will be located for carrying out the refraction at the preferred distance. Where, due to the configuration of the eyes being tested, it is impossible to position the instrument at the preferred distance, the refracting distance which is used may be measured by noting the location at which the cornea crosses the scale and as will be well understood, by adding or subtracting the scale reading to the preferred refracting distance.

It is desirable, although not essential to the practice of the invention, to illuminate each cornea while adjusting the instrument to the refracting distance. Illuminating means for this purpose comprise an electric socket 62 which is provided with a suitable light bulb 63 and which is mounted in each auxiliary housing 55. An opening in the back face of each auxiliary housing 55 permits access to the reflecting means 57 therein and is provided with a cover 64 which supports a bracket, not shown but adapted to carry the socket 62. Each bracket may be attached to its cover by screws 65 or other suitable fastenings and the cover 64 may be removably secured to the auxiliary housing by conventional spring clip means.

The light source in each auxiliary housing 55 is located somewhat above and to the side of the prism 57 which is nearest the patient's eye. This expedient allows light from each bulb 63 to be directed through the opening 58 adjacent the bulb and onto the eye and, by illuminating the latter, permits a clear and strong image thereof to the end of facilitating the adjustment of the refractor. Obviously, it is possible to dispense with the light sources 63 within the auxiliary housings 55 and to adjust the instrument by the use of one or more lights located externally thereof.

Eye testing is preferably conducted in a room which is indirectly lighted, direct light being kept from the patient's face during the testing which follows adjustment of the instrument in order to prevent glare in the patient's eyes. As light sources for this purpose are generally located in back of the instrument, it is frequently difficult for the refractionist, who stands in front of the refractor to properly see the lens power indicia in the observation windows 35 and 53.

In overcoming this difficulty, use is made of separate electric bulbs 66 mounted in each housing 10 and 11 adjacent the front face of the housing. Each front face member 16 is provided with a cutaway portion adapted to be closed by a cover 67 which may be removably secured to the front face member by the spring clip construction disclosed in Figure 2. A bracket 68 which carries an electric socket 69 for a bulb 66 is secured to the inner face of each cover 67 by screws or other fastening means.

By locating the light source 66 in each housing so that it is in front of the cylinder disk 31 and shutter disk 42, light therefrom will fall on portions of the lens carrying disks which have lens power indicia in registration with the windows 35 and 53 so that the indicia may be easily discerned and read. The portion of each sight tube 37 which extends within each housing together with the mechanism used to rotate the disks will effectively prevent light within the housing from crossing the patient's field of vision when he is looking through the sight openings 27 and 28. Also any light from a source 66 which may enter a hollow shaft 40 will be substantially lost before it can reach a patient's eye through an opening 58 in an auxiliary housing 55.

Two separate light sources operated at different times and for different purposes have been shown in each of two movable housings. In connecting the sets of bulbs 63 and 66 to a suitable source of electrical energy so that one or the other of the sets may be energized at will, use is made of a conventional two-way switch 70 which is fixedly mounted on the back of the support 14 and is hence stationary with respect to the housings 10 and 11 when they are moved for the pupillary distance adjustment. Flexible cables 71 and 72, shown as leading to and from the switch 70, are formed of a suitable number of wires which latter are connected, in a manner well understood by the art, to a source of electrical energy (not shown), the binding posts of the switch (also not shown) and the electrical sockets 62 and 69 so that either set of bulbs may be illuminated in accordance with the position of a fingerpiece 73 for operating the switch 70.

When fingerpiece 73 is in its upper position, shown in Figure 5 as marked "Lenses," the bulbs 66 are energized to illuminate the lens power indicia. Movement of fingerpiece 73 to the position marked "Cornea" will cut the bulbs 66 out of the circuit while causing the bulbs 63 in the auxiliary housings to be energized. The wires of cable 71 are adapted to be detachably connected to the electrical supply source and when so connected one or the other of the two sets of light sources will be energized.

Cables 72 extend outwardly on opposite sides of the switch 70 so that each one may be run to a separate lens carrying housing. With reference to Figures 1, 4 and 5, each cable 72 leads downwardly across the back face member 17 of its respective lens carrying housing and after passing through the auxiliary housing 55 of such main housing continues outwardly to the edge of the latter which is most distant from the center of the instrument. At this last location, each cable 72 is passed into the lens carrying housing with which it is associated and the wires of the cable are connected to the electric socket 69. Lead wires, not illustrated in the drawings, are run from each socket 62 within each auxiliary housing 55 to the cable 72 which passes through such auxiliary housing and are connected in suitable manner to the wires of such cable.

As the housings 10 and 11 are movable with respect to the switch 70, each cable 72 is made of a length which is considerably greater than the shortest distance between the switch and the electrical socket 69 when the lens carrying housing with which the cable is associated is at its outermost position of adjustment. By this expedient, flexible and extensible connection means are provided between the relatively fixed switch 70 and the light sources in the movable lens carrying housings.

Operation of the refractor will be apparent. With the patient seated before the instrument, the refractor is suitably positioned before the patient's face and the separation of the housing is adjusted, by means of the hand wheel 23, to the patient's pupillary distance. Each cylinder disk 31 is then suitably rotated to align its open aperture with an observation window 59. Fingerpiece 73 of the switch 70 being in its lower position, the electric bulbs 63 are energized and the refractionist, by sighting through the hollow shafts 40, is enabled to determine the refracting distance for the position of the instrument. Knowing the refracting distance it is possible for the refractionist, where the configuration of the patient's eyes permits of the same, to move the instrument towards or away from the patient's face so as to set the refracting distance at some preferred amount. On moving the fingerpiece 73 to its upper position, in order to illuminate the lens power indicia, the instrument is ready for carrying out the usual eye tests and examination. These are conducted in well known manner aided by the ability of the instrument to place various combinations of spherical and cylindrical lenses and also elements and openings of the shutter disk 42 before the eyes of the patient. The instrument is also provided with the usual vision testing accessories 14 such as Maddox rods, cross cylinders, Risley prisms and the like. Sets of these accessories are pivotally mounted on a suitable post carried by each lens carrying housing so that they may be selectively positioned before each sight opening 28. Also, as shown, the instrument is provided with suitable means 75 for supporting the usual reading card, not shown but employed in conducting distance tests.

From the foregoing, it will be appreciated that the aims and objects of the invention have been attained in that an instrument of simple operation and improved efficiency has been provided. This has been possible because of the provision of novel cornea sighting means also employable as measuring means for determining the refracting distance, the construction of the device whereby the lens power indicia is illuminated and the use of simple mechanism for adjusting the separation of the lens carrying housings.

We claim:

1. In an eye testing device having a disk carrying a plurality of test lenses, said disk being rotatably mounted to permit the lenses thereof to be selectively aligned with the eye of a patient undergoing examination, the combination of a hollow shaft, said disk rotatably mounted on said shaft, the optical axis of each lens carried by said disk being substantially parallel with the longitudinal axis of said shaft when the lens is in operative position before the patient's eye and light deflecting means aligned with said shaft whereby to permit an observer to look through said shaft and observe the position of the cornea of the patient's eye with respect to the test lens which is aligned with said eye.

2. In an eye testing device having a disk carrying a plurality of test lenses, said disk being rotatably mounted to permit the lenses thereof to be selectively aligned with the eye of a patient undergoing examination, the combination of a hollow shaft, said disk rotatably mounted on said shaft, the optical axis of each lens carried by said disk being substantially parallel with the longitudinal axis of said shaft when the lens is in operative position before the patient's eye and reflecting means aligned with said shaft and having a scale and a fiducial line whereby to permit an observer to look through said shaft to observe the position of the cornea of the patient's eye with respect to the test lens which is aligned with said eye and to measure the distance between said cornea and said test lens.

3. In an eye testing instrument having a housing provided with a sight opening in its front and its back face through which a patient looks and a disk which is rotatably mounted within the housing and carries a plurality of test lenses in positions to be selectively aligned with said sight openings on rotation of said disk, the combination of a hollow shaft mounted in said housing, said disk being rotatably mounted on said shaft, and optical means at one end of said shaft for forming in alignment therewith an image of the cornea of an eye of a patient who is being tested whereby an observer may see an image of said cornea on looking into said shaft, the longitudinal axis of said shaft and the axis which extends through said sight openings being substantially parallel with each other.

4. The combination in an eye testing instrument of a pair of housings, each housing having a pair of aligned sight openings through which an eye of a patient is adapted to look, a hollow shaft within each housing, the axis of each shaft being substantially parallel with the axis of the aligned sight openings in its housing, a disk within each housing rotatably mounted on each shaft, lenses carried by each disk in positions to be selectively aligned with the sight openings in their respective housing on the rotation of their respective disk, separate reflecting means carried by each housing in alignment with the shaft therein at a position to image the cornea of the eye of a patient being tested whereby an observer looking through a shaft may observe the cornea adjacent the shaft, and scale means and fiducial means associated with each reflecting means for measuring the distance between each cornea of the patient and the respectively adjacent lens aligned therewith.

5. Ophthalmic apparatus comprising a support, a pair of housings adjustable of said support toward and away from each other, each housing being provided with aligned sight openings in its opposite faces through which a patient looks, a lens carrying disk in each housing, lenses mounted in each disk, each disk being rotatably mounted within its housing with the lenses thereof positioned for selective alignment with said openings in the housing on rotation of the disk, lens power indicia on the face of each disk away from the patient, each housing having an observation window with which said lens power indicia is adapted to register, electric illuminating means within each housing positioned between the face of the disk therein on which said indicia appears and the face of the housing having said observation window whereby to illuminate said indicia, control means operable at will for causing said illuminating means to be energized, said control means carried by said support and adapted to be connected to a source of electrical energy, and extensible conductor means connecting said control means to the illuminating means within each housing, each housing having an opening adjacent the observation window, a plate detachably secured to the housing for covering said opening, said illuminating means comprising an incandescent lamp, said lamp being secured to the inner face of said plate.

6. In an eye testing instrument having a housing provided with a sight opening in its front and its back face through which a patient looks and a disk which is rotatably mounted within the housing and carries a plurality of test lenses in positions to be selectively aligned with said sight openings on rotation of said disk, the combination of a hollow shaft mounted in said housing, said disk being rotatably mounted on said shaft, optical means at one end of said shaft and in alignment therewith for imaging the cornea of an eye of a patient who is being tested whereby an observer may see an image of said cornea on looking into said shaft, the longitudinal axis of said shaft and the axis extending through said sight openings being substantially parallel with each other, and a light source carried by said housing adjacent said optical means whereby to illuminate the eye of the patient being tested.

7. The combination in an eye testing instrument of a pair of housings, each housing having a pair of aligned sight openings through which the eye of a patient is adapted to look, a pair of shafts mounted in each housing, one shaft of each pair being hollow and each shaft of each pair having its longitudinal axis substantially parallel to the aligned sight openings in its housing, a disk rotatably mounted on each shaft, lenses carried by each disk and each disk being provided with an open aperture, the lenses and open aperture of each disk being positioned to be selectively aligned with the sight openings in their respective housing on rotation of their respective disk, the hollow shaft of each pair of shafts being located with respect to the second shaft of each pair to have the lenses and free aperture of the disk on the second shaft brought into alignment with an end of said hollow shaft, the face of each housing most distant from the patient having an opening aligned with the hollow shaft therein, and optical means aligned with each hollow shaft for imaging the cornea of the eye of a patient being tested whereby an observer looking through a hollow shaft may observe the cornea adjacent that shaft.

8. In an ophthalmic instrument having a sight aperture, a disk carrying a plurality of spaced optical elements, a shaft on which said disk is rotatably mounted to permit said elements to be selectively positioned in alignment with said aperture, said shaft having a sight opening, and means for measuring the distance between the cornea of an eye positioned before said aperture and one of the optical elements positioned in alignment with the aperture, said means comprising fiducial means and light deflecting means in optical alignment with said sight opening.

9. In an ophthalmic instrument the combination of a housing having a sight aperture, a disk carrying a plurality of lenses in spaced relation along its periphery, a shaft having a longitudinal sight opening, said disk being rotatably mounted on said shaft whereby the lenses may be selectively positioned before the sight aperture, and means for locating the eye of a patient with respect to a lens positioned before said aperture, said means comprising optical means for imaging the eye in alignment with the sight opening and fiducial means cooperatively associated with the optical means.

10. In an ophthalmic instrument the combination of a housing having a sight aperture, a first disk carrying a plurality of spaced lenses, a hollow shaft, said disk being rotatable on said shaft whereby said lenses may be selectively positioned before said aperture, a second disk having spaced lenses and a free aperture, said second disk overlying said first disk and having a smaller diameter than said first disk, said second disk being rotatably mounted whereby its lenses or the free aperture may be selectively positioned opposite said sight aperture, the rotation of said second disk also being adapted to selectively position said free aperture opposite an end of said hollow shaft, and means for determining the distance between a lens and an eye positioned before said sight aperture, said means comprising light deflecting means in optical alignment with said hollow shaft and scale means associated with said light deflecting means.

FREDERICK W. JOBE.
RAYMOND F. E. STEGEMAN.